US010392260B2

(12) United States Patent
Lehmkuhl et al.

(10) Patent No.: US 10,392,260 B2
(45) Date of Patent: Aug. 27, 2019

(54) METHOD OF TREATING PHOSPHATE-CONTAINING ASH FROM WASTE-INCINERATION PLANTS BY WET-CHEMICAL DIGESTION IN ORDER TO OBTAIN COMPOUNDS OF ALUMINIUM, CALCIUM, PHOSPHORUS AND NITROGEN

(71) Applicant: Remondis Aqua GmbH & Co. KG, Luenen (DE)

(72) Inventors: Josef Lehmkuhl, Haltern am See (DE); Martin Lebek, Okerweg (DE)

(73) Assignee: REMONDIS AQUA GMBH & CO. KG, Lünen (DE)

( * ) Notice: Subject to any disclaimer, the term of this patent is extended or adjusted under 35 U.S.C. 154(b) by 421 days.

(21) Appl. No.: 15/034,819

(22) PCT Filed: May 20, 2014

(86) PCT No.: PCT/EP2014/001361

§ 371 (c)(1),
(2) Date: May 5, 2016

(87) PCT Pub. No.: WO2015/067328

PCT Pub. Date: May 14, 2015

(65) Prior Publication Data

US 2016/0257574 A1 Sep. 8, 2016

(30) Foreign Application Priority Data

Nov. 6, 2013 (DE) ........................ 10 2013 018 650

(51) Int. Cl.

| | |
|---|---|
| ***C01F 11/46*** | (2006.01) |
| ***C01B 25/36*** | (2006.01) |
| ***C05B 11/06*** | (2006.01) |
| ***C01B 25/32*** | (2006.01) |
| ***C01F 11/38*** | (2006.01) |
| ***C01F 11/36*** | (2006.01) |

(52) U.S. Cl.

CPC .............. *C01F 11/46* (2013.01); *C01B 25/32* (2013.01); *C01B 25/322* (2013.01); *C01B 25/36* (2013.01); *C01F 11/36* (2013.01); *C01F 11/38* (2013.01); *C05B 11/06* (2013.01)

(58) Field of Classification Search

None

See application file for complete search history.

(56) References Cited

FOREIGN PATENT DOCUMENTS

| | | | | |
|---|---|---|---|---|
| EP | 2602013 A1 * | 6/2013 | ............. | B01D 11/02 |
| GB | 665257 * | 1/1952 | | |

* cited by examiner

*Primary Examiner* — Melissa S Swain

(74) *Attorney, Agent, or Firm* — John P. White; Cooper & Dunham LLP

(57) ABSTRACT

The invention concerns a method of treating phosphate-containing waste, in particular phosphate-containing ash from waste-incineration plants, by wet-chemical digestion in order to obtain compounds of aluminum, calcium, phosphorus and nitrogen.

20 Claims, 3 Drawing Sheets

Figure 1:
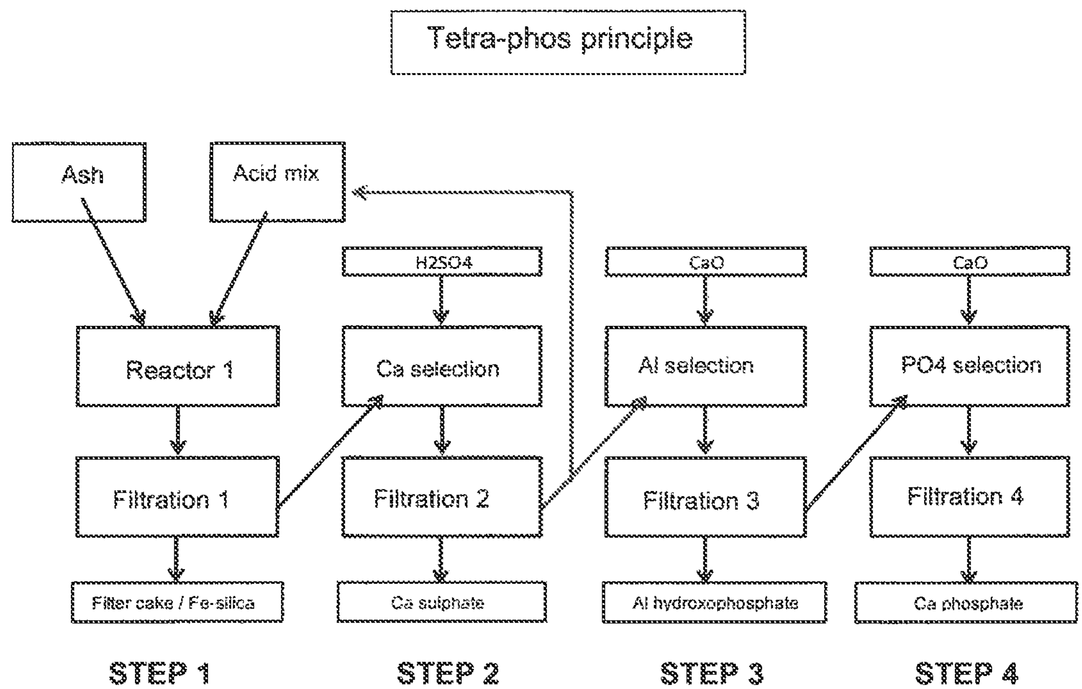

METHOD OF TREATING PHOSPHATE-CONTAINING ASH FROM WASTE-INCINERATION PLANTS BY WET-CHEMICAL DIGESTION IN ORDER TO OBTAIN COMPOUNDS OF ALUMINIUM, CALCIUM, PHOSPHORUS AND NITROGEN

CROSS-REFERENCE TO RELATED APPLICATIONS

This application is a § 371 national stage of PCT International Application No. PCT/EP2014/001361, filed May 20, 2014, claiming priority of German Patent Application No. 10 2013 018 650.1, filed Nov. 6, 2013, the content of each of which is hereby incorporated by reference into the application.

The invention concerns a method of treating phosphate-containing waste, in particular phosphate-containing ash from waste-incineration plants, by wet-chemical digestion in order to obtain compounds of aluminium, calcium, phosphorus and nitrogen.

Raw phosphates are required for the production of fertilizer. In order to be able to replace the finite raw phosphates, it is well known that the recovery of phosphorus or phosphates from wastes and waste water it is intended in the European industrial countries (see Patent DE 10 2012 015 065 B3). This is also appropriate, as the raw phosphates are increasingly contaminated with heavy metals such as cadmium and uranium and this contamination can be found again in the fertilizers and in groundwater.

A major phosphate resource in Europe is the waste water from municipal and industrial sewage treatment plants. In Germany alone, approximately 50,000 Mg (t) phosphorus enter the waste water each year and are for the most part precipitated as metal salts, using precipitating agents such as iron or aluminium salts and are removed with the sewage sludge. Nowadays, the phosphate-containing sewage sludges are mostly incinerated and the ultimately obtained ash disposed or “misappropriated” elsewhere (e.g. road construction, backfilling), since the therein contained phosphorus is—with a few exceptions in pilot facilities—not recovered.

Similar to other industrial recycling processes such as the recovery of iron from scrap, the recycling of paper from waste paper, the recovery of copper and other metals from electrical equipment, even an industrial recovery of phosphorus from waste is possible. A crucial prerequisite therefore is that the phosphorus-containing residues show a sufficiently high concentration of phosphorus and exhibit low contamination and essentially correspond to the currently applied raw phosphates, preferably without the harmful uranium and cadmium contamination.

Phosphates are obtained from raw phosphate (rock, with a phosphorus content of approximately 30% $P_2O_5$) by acid digestion with preferably sulphuric acid, whereby phosphoric acid and/or calcium phosphate fertilizer is produced (so-called “superphosphate”). The ashes from incinerated sewage sludges or animal wastes, such as meat and bone (animal) meal, contain up to 35 wt % $P_2O_5$, however, depending on the precipitant, even up to 25 wt % iron oxide, aluminium oxide or calcium oxide. This high metal oxide content, which can be up to tenfold higher than in the raw phosphate, restricts considerably the use of sewage sludge ashes in industrial processes as an alternative raw phosphate. A problem solution is demonstrated with the Patent DE 10 2012 015 065 B3, whereby during waste water treatment phosphates are bound by aluminium salts and subsequently converted to calcium phosphate, so that in following incineration of the sewage sludge, the remaining ash contains preferably calcium phosphate, and preferably little aluminium and iron compounds. The calcium phosphate rich ash is suitable for use as raw phosphate for fertilizer production, however, always in combination with accompanying contaminations from the ash.

Ashes resulting from the incineration of sewage sludges, organic wastes, biodegradable wastes, animal wastes etc. such as animal meal contain various recyclables. The following table shows the main components (calculated as oxides) and the content of reusable materials of some ashes that are produced during the incineration of sewage sludge:

| | Ash A | Ash B | Ash C |
|---|---|---|---|
| % $Fe_2O_3$ | 21.9 | 3.1 | 11.9 |
| % $Al_2O_3$ | 9.3 | 21.5 | 12.4 |
| % CaO | 15.2 | 14.5 | 11.4 |
| % $P_2O_5$ | 21.0 | 23.0 | 20.5 |
| % $SiO_2$ | 18.2 | 27.0 | 23.0 |

The special high value of ashes is justified by their content of $P_2O_5$, CaO and $Al_2O_3$.

Currently, it is not possible to recover efficiently and economically the different recyclables as marketable products in such ashes. The invention described herein describes an optionally multistep method for obtaining not only calcium phosphate-containing fertilizers from ashes, but also higher-quality phosphates such as pure calcium phosphate and/or calcium nitrate-phosphate or phosphoric acid and/or nitrous phosphoric acid like calcium sulphate (gypsum) and aluminium hydroxophosphate.

The method according to the invention is based on converting the recyclables from the ash into different products, particularly into products from the group calcium nitrate ($CaNO_3$), calcium phosphate ($Ca_3(PO_4)_2$), calcium sulphate ($CaSO_4$) and aluminium hydroxophosphate ($Al(OH)_3 \times AlPO_4$), by fractional dissolving in mineral acids and through addition of suitable reactants.

The method according to the invention is shown schematically in FIG. 1.

When dissolving the recyclables from phosphate-containing ashes in step 1, explicitly no hydrochloric acid or other halohydric acid is used, as is today part of the state of the art.

If ashes are treated with hydrochloric acid, iron, aluminium and calcium salts dissolve, preferably their phosphates. From the joint digestion solution, different fractions of aluminium compounds and or calcium phosphate can be obtained, the disadvantage being however the chloride component which—as all respective chlorides are easily soluble—ultimately can leave the process as waste water or can be recovered only very elaborately, e.g. by evaporation.

This serious disadvantage is impressively solved by the invention with an (optional) multi-stage method, wherein in the initial step of the ash treatment (the dissolving process in acid) not diluted hydrochloric acid but rather diluted nitric acid and/or diluted phosphoric acid is used. The salts of these acids, such as calcium phosphate or calcium nitrate, are of considerably higher value, compared to for example sodium or calcium chloride, so that the salts, particularly calcium phosphate and calcium nitrate, can be obtained by precipitation and evaporation processes and, through their commercialization—especially as NP-fertilizers (NP=nitrogen-phosphorus fertilizer) the entire recycling process becomes economical.

The first step shall essentially be described by the following equations:

$$Ca_3(PO_4)_2+6HNO_3=3Ca(NO_3)_2+2H_3PO_4$$

$$AlPO_4+3HNO_3=Al(NO_3)_3+H_3PO_4$$

From the solids, e.g. the ash, Ca and Al ions dissolve particularly, while Fe ions pass only in small amounts into solution and remain in the residue with the likewise barely soluble silicates (SiO2). Like in the state of the art, the insoluble components are separated from the acid digestion solution by filtration, e.g. using a decanter, a vacuum belt filter or a filter press. Preferably, in order to reduce looses, the residue in the filtering units is washed with water and the washing water is led back to the first process step as dilution water for the digestion acid.

Following step 1, calcium sulphate can now be precipitated ($CaSO_4$, Gypsum) by addition of sulphuric acid ($H_2SO_4$) to the resulting filtrate or supernatant after step 1. This is carried out in the acidic, filtered digestion solution in the second step, according to the chemical equation $$3Ca(NO_3)_2 + 3H_2SO_4 = 3CaSO_4\downarrow + 6HNO_3$$

$$CaHPO_4 + H_2SO_4 = CaSO_4 + H_3PO_4$$

In order to reduce the need for nitric acid and to design the process more economically, the recovery of nitric acid or phosphoric acid is an important step of the multistep method. Thus, an almost complete recovery of the nitric acid or phosphoric acid is possible, if the diluted sulphuric acid is dosed in stoichiometric ratio to the calcium content, wherein the precipitation to calcium sulphate (gypsum) is completely surprisingly possible also at a pH-value below 1. The sum of the two steps results in the following chemical equation:

$$Ca_3(PO_4)_2 + 6HNO_3 = 3Ca(NO_3)_2 + 2H_3PO_4$$

$$3Ca(NO_3)_2 + 3H_2SO_4 = \underline{3CaSO_4}\downarrow + 6HNO_3$$

The potassium sulphate precipitate (gypsum) is filtered in a conventional manner, dehydrated and washed with water. This acidic wash water is, preferably, also fed back in the first process step as dilution water. The dewatered gypsum can be further processed in further process steps aside the procedure chain described herein, e.g. by calcination to anhydrite or by chemical conversion, according to patent DE 196 11 454 A1.

By multiple recirculation, by continuously dissolving phosphate from the ash, the concentration of phosphoric acid is always further increased and can be boosted to a concentration above 30% $H_3PO_4$, if the also co-dissolved aluminium ions would not primarily interfere. Depending on $Al_2O_3$ content of ash, the Al concentration in the digestion acid can rise above 5%, so that commercialisation is no longer possible. According to the invention, this problem is solved in a third step, whereby aluminium ions are precipitated as aluminium hydroxophosphate by addition of preferably calcium oxide.

Due to the high salt concentration in the digestion acid, the aluminium hydroxophosphate precipitation is surprisingly possible already through addition of small amounts of hydroxyl ions with only a slight increase of the strongly acidic pH-value from approximately pH 1 to 1.5 to pH 2.0 to 2.5. This is preferably achieved by addition of calcium oxide (CaO), but also by addition of calcium hydroxide, calcium carbonate, calcium silicate (sand-lime brick) sodium hydroxide or sodium silicate. Like in the prior art, the precipitate from aluminium hydroxophosphate is separated or recovered by filtration, e.g. using a decanter, a vacuum belt filter or a filter press.

The process of the third step can be described by the following equation:

$$2Al(NO_3)_3 + 2H_3PO_4 + 4CaO = Al(OH)_3 \text{ x } AlPO_4\downarrow + CaHPO_4 + 3Ca(NO_3)_2 + H_2O$$

While Ca phosphate and Ca nitrate remain in solution, the Al salts precipitate already at a pH value of about 2.

After the separation (depletion) of Ca and Al ions in the process steps two and three, an only slightly contaminated phosphoric acid or nitrous phosphoric acid was formed. This can be concentrated by evaporation and used as phosphoric acid or nitrous phosphoric acid for the production of fertilizer, whereby mineral raw phosphates can be digested with this acid, what state of the art is.

Furthermore, the purified phosphoric acid or nitrous phosphoric acid may be recycled and, according to the invention, used in the first step for dissolving contents of the ash.

In a preferred variant of the method, where the nitrous phosphoric acid is formed, in the fourth step, the nitrous phosphoric acid is neutralized with limestone (calcium carbonate) or quicklime (calcium oxide) and the precipitate is evaporated, so that a mixture of calcium phosphate and calcium nitrate is formed.

$$2H_3PO_4+2HNO_3+2CaO=Ca(NO_3)_2+Ca(H_2PO_4)_2+2H_2O$$

This mixed product is a preferred NP-fertilizer.

Figure 2:
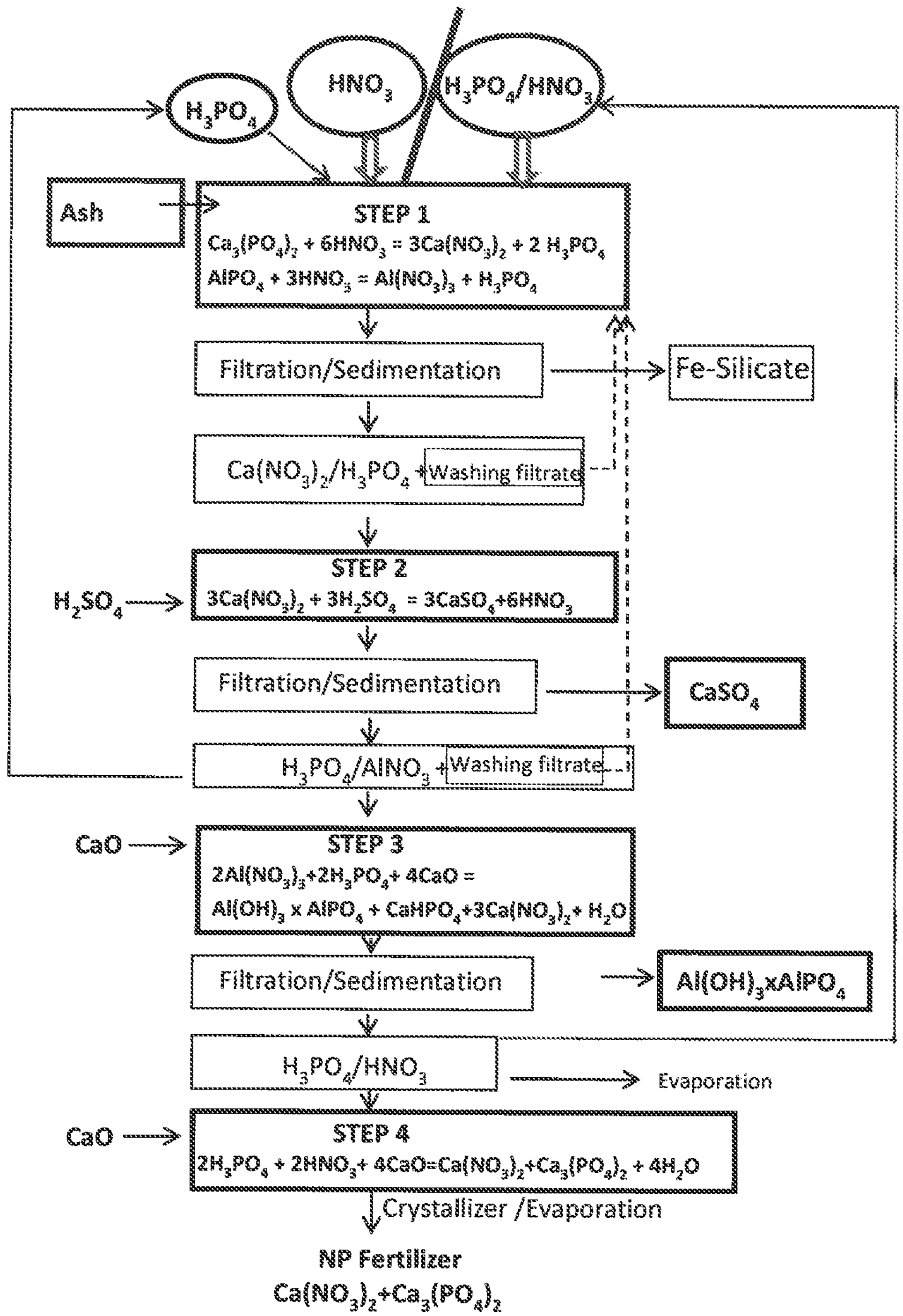

FIG. 2 shows an overview of the process steps.

If all four steps 1-4 are performed successively, then the recyclables calcium nitrate ($CaNO_3$), calcium phosphate ($Ca_3(PO_4)_2$), calcium sulphate ($CaSO_4$), and aluminium hydroxophosphate ($(Al(OH)_3 \times AlPO_4$) can be obtained simultaneously from the phosphate-containing solids, e.g. ashes in a one single method.

It is evident that all four stages of the process must under no circumstances be necessarily conducted. It is also possible, for example, to win (steps 1, 2, 4) only calcium phosphate and calcium sulphate (gypsum). Alternatively, steps 1, 3 and 4 may be performed only.

Interestingly, the steps 2 and 3 can also be skipped, so that step 4 may be performed directly after step 1.

Furthermore, the chronological order can be varied, while e.g. after step 1 the step 3 and then steps 2 and subsequently 4 are performed.

As described in detail above, the resulting phosphoric acid ($H_3PO_4$) or the formed nitrous phosphoric acid ($HNO_3/H_3PO_4$) after step 2 and step 3 can be recycled back again in order to be used in the treatment of the ash in step 1. This recycling of the Al- and Ca-depleted acid allows an enormous cost reduction, since the ash dissolving requires less fresh acid.

In a first aspect A1, the present invention relates to a method of obtaining (generating) precipitates, selected from the group consisting of calcium nitrate ($CaNO_3$), calcium phosphate ($Ca_3(PO_4)_2$), calcium sulphate ($CaSO_4$), and aluminium hydroxophosphate ($Al(OH)_3 \times AlPO_4$); from phosphate-containing ashes from waste incineration plants, the method comprising at least the obtaining (generating) of calcium phosphate ($Ca_3(PO_4)_2$) and calcium nitrate ($CaNO_3$), characterized in that a) the solids (ash) are reacted with nitric acid or phosphoric acid or a mineral acid mixture of these two acids, b) the acid-insoluble portion of the solids is separated, c) optionally, the filtrate or the supernatant is at least partially recycled for the use in step a), d) optionally, the filtrate or the supernatant is concentrated, preferably by evaporation, in order to obtain phosphoric or nitrous phosphoric acid ($HNO_3/H_3PO_4$), e) optionally, calcium phosphate precipitate and calcium nitrate precipitate are recovered and separated by adding calcium oxide or calcium carbonate to the filtrate or to the supernatant, wherein steps a), b) and e) are carried out preferably.

In a further alternative embodiment of aspect A1 steps a), b) and d) are carried out preferably.

In a further alternative embodiment of aspect A1 steps a), b), c) and d) are carried out preferably.

In a further alternative embodiment of aspect A1 steps a), b), c) and e) are carried out preferably.

If in an embodiment of aspect A1, the step c) is carried out, then at least 10% of the filtrate/supernatant are preferably recycled for the use in step a), particularly preferably at least 20%, even more preferably 20% to 80%, and most preferably 40% to 60%, based on the total filtrate amount obtained.

In a second aspect A2, the present invention relates to a method of obtaining (generating) precipitates selected from the group consisting of calcium nitrate ($CaNO_3$), calcium phosphate ($Ca_3(PO_4)_2$), calcium sulphate ($CaSO_4$) and aluminium hydroxophosphate ($Al(OH)_3 \times AlPO_4$); of phosphate-containing ashes from waste incineration plants, the method comprising at least the obtaining (generation) of calcium sulphate ($CaSO_4$), characterized in that a) the solids (ash) are reacted with nitric acid or phosphoric acid or a mineral acid mixture of these two acids, b) the acid-insoluble portion of the solids is separated, c) a pH-value<1 is adjusted and calcium sulphate precipitate is obtained and separated by adding sulphuric acid to the filtrate or supernatant.

Optionally, in a preferred embodiment of the aspect A2, the optional steps c)-e) of the aspect A1 can be linked, following the generation/separation of calcium sulphate according to step c) of the aspect A2, as described herein, whereby step c) is carried out preferably.

Optionally, in a preferred embodiment of the aspect A2, the optional steps c)-e) of the aspect A1 can be linked, following the generation/separation of calcium sulphate according to step c) of the aspect A2, as described herein, whereby step e) is carried out preferably.

Optionally, in a preferred embodiment of the aspect A2, the optional steps c)-e) of the aspect A1 can be linked, following the generation/separation of calcium sulphate according to step c) of the aspect A2, as described herein, whereby steps c) and d) are carried out preferably.

Optionally, in a preferred embodiment of the aspect A2, the optional steps c)-e) of the aspect A1 can be linked, following the generation/separation of calcium sulphate according to step c) of the aspect A2, as described herein, whereby steps c) and e) are carried out preferably.

If in an embodiment of aspect A2, the step c) of aspect A1 is carried out, then at least 10% of the filtrate/supernatant are preferably recycled for use in step a), particularly preferably at least 20%, even more preferably 20% to 80%, and most preferably 40% to 60%, based on the total filtrate amount obtained.

In a third aspect A3, the present invention relates to a method of obtaining (generating) precipitates selected from the group consisting of calcium nitrate ($CaNO_3$), calcium phosphate ($Ca_3(PO_4)_2$), calcium sulphate ($CaSO_4$) and aluminium hydroxophosphate ($Al(OH)_3 \times AlPO_4$); of phosphate-containing ashes from waste incineration plants, the method comprising at least the obtaining (generating) of aluminium hydroxophosphate ($Al(OH)_3 \times AlPO_4$), characterized in that a) the solids (ash) are reacted with nitric acid or phosphoric acid or a mineral acid mixture of these two acids, b) the acid-insoluble portion of the solids is separated, c) the dissolved aluminium as aluminium hydroxophosphate precipitate is obtained and separated by raising the pH-value in the filtrate or supernatant.

Optionally, in a preferred embodiment of the aspect A3, the optional steps c)-e) of the aspect A1 can be linked, following the generation/separation of aluminium hydroxophosphate precipitate according to step c) of the aspect A3, as described herein, whereby step e) is carried out preferably.

Optionally, in a preferred embodiment of the aspect A3, the optional steps c)-e) of the aspect A1 can be linked, following the generation/separation of aluminium hydroxophosphate precipitate according to step c) of the aspect A3, as described herein, whereby step d) is carried out preferably.

Optionally, in a preferred embodiment of the aspect A3, the optional steps c)-e) of the aspect A1 can be linked, following the generation/separation of aluminium hydroxophosphate precipitate according to step c) of the aspect A3, as described herein, whereby steps c) and d) are carried out preferably.

Optionally, in a preferred embodiment of the aspect A3, the optional steps c)-e) of the aspect A1 can be linked, following the generation/separation of aluminium hydroxophosphate precipitate according to step c) of the aspect A3, as described herein, whereby steps c) and e) are carried out preferably.

If in an embodiment of aspect A3, the step c) of aspect A1 is carried out, then at least 10% of the filtrate/supernatant are preferably recycled for use in step a), particularly preferably at least 20%, even more preferably 20% to 80%, and most preferably 40% to 60%, based on the total filtrate amount obtained.

In a fourth aspect A4, the present invention relates to a method of obtaining (generating) precipitates selected from the group consisting of calcium nitrate ($CaNO_3$), calcium phosphate ($Ca_3(PO_4)_2$), calcium sulphate ($CaSO_4$) and aluminium hydroxophosphate ($Al(OH)_3 \times AlPO_4$); of phosphate-containing ashes from waste incineration plants, characterized in that a) the solids (ash) are reacted with nitric acid or phosphoric acid or a mineral acid mixture of these two acids, b) the acid-insoluble portion of the solids is separated, c) calcium sulphate precipitate is obtained and separated by adding sulphuric acid to the filtrate or supernatant, d) the dissolved aluminium as aluminium hydroxophosphate precipitate is obtained and separated by raising the pH-value in the filtrate or supernatant, e) optionally, the filtrate or the supernatant is at least partially recycled for use in step a), f) optionally, the filtrate or the supernatant is concentrated by evaporation of water, in order to obtain phosphoric acid or nitrous phosphoric acid ($HNO_3/H_3PO_4$), or g) optionally, calcium nitrate precipitate and/or calcium phosphate precipitate are obtained and separated by adding calcium oxide or calcium carbonate to the filtrate or the supernatant or, alternatively, are concentrated through evaporation or spray drying wherein out of the optional steps e)-g step g) is carried out preferably.

Optionally, in a preferred embodiment of the aspect A4, from the optional steps e)-g), the steps e) and g) are carried out preferably.

Optionally, in a preferred embodiment of the aspect A4, from the optional steps e)-g), the steps e), f) and g) are carried out preferably.

Optionally, in a preferred embodiment of the aspect A4, from the optional steps e)-g), the steps e) and f) are carried out preferably.

If in an embodiment of aspect A4, the step e) is carried out, so at least 10% of the filtrate/supernatant are preferably recycled for use in step a), particularly preferably at least 20%, even more preferably 20% to 80%, and most preferably 40% to 60%, based on the total filtrate amount obtained.

As already described herein in the method according to the present invention the sequence of steps 2 and 3 (precipitation of calcium sulphate, precipitation of aluminium hydroxophosphate) does not have necessarily happen in this sequence so that step 1 may also be followed by step 3 (and then by step 2).

In a fifth aspect A5, the present invention relates to a method of obtaining (generating) precipitates selected from the group consisting of calcium nitrate ($CaNO_3$), calcium phosphate ($Ca_3(PO_4)_2$), calcium sulphate ($CaSO_4$), and aluminium hydroxophosphate ($Al(OH)_3 \times AlPO_4$); of phosphate-containing ashes from waste incineration plants, characterized in that a) the solids (ash) are reacted with nitric acid or phosphoric acid or a mineral acid mixture of these two acids, b) the acid-insoluble portion of the solids is separated, c) the dissolved aluminium as aluminium hydroxophosphate precipitate is obtained and separated by raising the pH-value in the filtrate or supernatant d) calcium sulphate precipitate is obtained and separated by adding sulphuric acid to the filtrate or supernatant e) optionally, the filtrate or the supernatant is at least partially recycled for the use in step a)

f) optionally, the filtrate or the supernatant is concentrated by evaporation of water, in order to obtain phosphoric acid or nitrous phosphoric acid ($HNO_3/H_3PO_4$), or g) optionally, calcium nitrate precipitate and/or calcium phosphate precipitate are obtained and separated by adding calcium oxide or calcium carbonate to the filtrate or the supernatant or, alternatively, are concentrated by evaporation or spray drying, wherein from the optional steps e)-g at least step g) is carried out preferably.

Optionally, in a preferred embodiment of the aspect A5, from the optional steps e)-g), the steps e) and g) are carried out preferably.

Optionally, in a preferred embodiment of the aspect A5, from the optional steps e)-g), the steps e), f) and g) are carried out preferably.

Optionally, in a preferred embodiment of the aspect A5, from the optional steps e)-g), the steps e) and f) are carried out preferably.

If in an embodiment of aspect A5, the step e) is carried out, than at least 10% of the filtrate/supernatant is preferably recycled for use in step a), particularly preferably at least 20%, even more preferably 20% to 80%, and most preferably 40% to 60%, based on the total filtrate amount obtained.

As described in detail herein, phosphoric acid ($H_3PO_4$) is obtained in the method according to the above aspects, so that these methods can naturally also be understood as methods for optional production of phosphoric acid ($H_3PO_4$), and corresponding embodiments are part of the present invention.

In preferred embodiments of the aspects A1 to A5 and the associated embodiments above, the phosphate-containing ash is obtained by incineration of sewage sludges, biodegradable wastes, bio-wastes and/or animal wastes.

In preferred embodiments of the aspects A1 to A5 and the associated embodiments above, the phosphate-containing ash is obtained by incineration of sewage sludges, biodegradable wastes, bio-wastes and/or animal wastes in waste-incineration plants.

In the context of the invention, the term "precipitate" refers to the elimination of a dissolved substance as solid from a solution, usually initiated by additives of suitable substances (precipitant). In particular, the term encompasses any fully or partially insoluble precipitate in form of flakes, droplets or crystalline material, in any microcrystalline, crystalline or amorphous form. According to the invention, the term "precipitate" expressly involves any further processing, modification, refining, etc., of comprised precipitates into powders, fine powders, dusts, bulk material, granular materials, semolina etc.

In the sense of the invention, the term "calcium phosphate" encompasses $Ca_3(PO_4)_2$), $CaHPO4$ and $Ca(H_2PO_4)_2$.

In the sense of the invention, the term "ash" refers to any solid residue from the incineration of organic material, for example from sewage sludge, biodegradable wastes, bio-wastes and/or animal wastes, slaughterhouse wastes, e.g. animal meal. Ash consists mainly of oxides, and (bi)carbonates of various metals, e.g. $Al_2O_3$, CaO, $Fe_2O_3$, MgO, MnO, $P_2O_5$, $P_4O_{10}$, $K_2O$, $SiO_2$, $Na_2CO_3$, $NaHCO_3$, etc.

In the sense of the invention, the term "phosphate-containing ash" refers to ashes, as defined herein, which contain at least one phosphate, as defined herein.

In the sense of the invention, on the one hand, the term "phosphates" concerns $P_2O_5$ and $P_4O_{10}$. Furthermore, the term "phosphates" refers to the salts and esters of orthophosphoric acid ($H_3PO_4$), and involves expressly the condensates (polymers) of orthophosphoric acid and their esters. In particular, the term "phosphates" refers to metallic salts of phosphoric acid with the general formula $X(Y)m(PO_4)n$, where X and optionally Y is a metal selected from the group consisting of aluminium, beryllium, bismuth, lead, cadmium, chromium, iron, gallium, indium, potassium, cobalt, copper, magnesium, manganese, molybdenum, sodium, nickel, osmium, palladium, rhodium, ruthenium, strontium, titanium, vanadium, tungsten, zinc, tin.

In the sense of the invention, the term "waste-incineration plants" refers to all installations, facilities and the like, which are suitable for incineration of the atmosphere combustible components of any type of waste.

In the sense of the invention, the term "sewage sludge" refers to any suspension of finely dispersed particles of a solid substance in a liquid.

In a preferred embodiment, the liquid, in which the particles are suspended, is waste water as herein defined.

In the sense of the invention, the term "waste water" relates to all liquids of aqueous nature and/or organic nature, or mixtures thereof, which do not have drinking water quality within the meaning of the Drinking Water Ordinance (TrnkwV) and/or of national and/or international drinking water standards (e.g. DIN 2000 in Germany). The term waste water comprises further all waste water in accordance with § 54 para. 1 of the Water Resources Act (WHG).

In a preferred embodiment, according to the waste water in the sense of the invention, water can be contaminated or in its properties or its composition modified due to its use. Furthermore, in the sense of the invention, the term "waste water" comprises water, which properties are modified because of domestic, commercial, agricultural or other use and that during dry-weather with it together flowing off water (dirty water) as well as the flowing off water from rainfall, which can be collected from the region of built-up or fortified areas (rain water). The leakage and collected liquids from facilities for treatment, storage and separation of waste are also considered as waste water.

Waste water is domestic waste water from toilets (faecal or black water), sanitary facilities, kitchens and washing machines (washing or grey water) as well as waste water from premises, which discharge into the public sewage system (commercial or industrial waste water). Heated water from cooling systems counts also as waste water. According to the invention, waste water resulting from a variety of cleaning and treatment techniques from water treatment plants accounts to the waste water.

In a particularly preferred embodiment, the sewage sludge occurs as primary sludge, raw sludge, excess sludge, as treated and/or stabilised sewage sludge (aerobic/anaerobic).

In the sense of the invention, the term "bio-waste" relates to all organic wastes of animal or plant origin that is generated in a household or factory and can be degraded by microorganisms, soil-living organisms or enzymes. These include for example food remnants and cut grass. As a rule, bio-wastes are collected separately in the so-called organic waste bin and treated separately by composting and fermentation. The resulting compost and the digestate are often recycled again into the environment, among others in horticulture and agriculture. The term bio-waste comprises thereby both waste in accordance with the definition of the EU Waste Framework Directive garden and park waste, and food and kitchen waste (from households, restaurants, catering industry, retail and processing in the food industry).

In the sense of the invention, the term "biodegradable wastes" comprises besides bio-waste as defined herein, further also all organic wastes of animal or plant origin from agriculture and forestry that can be degraded by microorganisms, soil-living organisms or enzymes. In particular, this term encompasses all organic wastes of animal or plant origin from agriculture and forestry which further contain at least one of the following biodegradable materials, selected from the list consisting of wood, paper and cardboard.

In the sense of the invention, the term "animal wastes" comprises animal carcasses of changed, dead or stillborn large or domestic animals—or parts thereof—as well as slaughterhouse wastes, spoiled food of animal origin and animal by-products, such as milk, eggs, condemned material but also intestinal content and manure, as well as all further products and generated products.

In the sense of the invention, the term "animal wastes" comprises in particular meat and animal by-products of domestic animals, wild animals or livestock that have been killed or died due to illness, especially TSE contaminated carcasses and with chemicals or prohibited substances contaminated animals and trial animals. Furthermore, meat and by-products with the risk of other non-communicable diseases are encompassed.

In the sense of the invention, the term "animal waste" includes moreover killed, so not slaughtered animals, animal by-products (for example milk), and any animal products containing residues of medicines. Expressly included are also all wastes and by-products from slaughterhouses, kitchen wastes and food wastes, foods of animal origin that are no longer appropriate for human consumption, raw milk, fresh fish or fresh fish by-products. In particular included are:

- kitchen and food wastes of any kind,
- fish or other sea animals, as well as fish wastes of any kind,
- former animal-based food products, which are no longer being intended for human consumption for purposes other than health risks, e.g. packaging defects,
- parts of slaughtered animals,
- raw milk,
- shells, hatchery by-products and cracked egg by-products,
- hair, fur, horns, etc.,
- animal wastes from the food industry,
- skins, hooves and horns, pig bristles and feathers originating from animals,
- too long stored meat,
- low-quality meat,
- meat from animals exposed to considerable stress,
- blood of animals (not of ruminants) that were slaughtered in a slaughterhouse after an examination,
- parts of slaughtered animals and animal by-products, which are attributed to the production of human consumption intended products, degreased bones and greaves, as well as animal meal.

In preferred embodiments of the aspects A1 to A5 and the above associated embodiments, the incineration of sewage sludge, biodegradable wastes, bio-wastes and/or animal wastes is performed in waste incinerator plants at 600° to 1200° C., preferably at 800° to 900° C.

In preferred embodiments of the aspects A1 to A5 and the above associated embodiments, the reaction of solids (ash) is carried out with nitric acid.

In preferred embodiments of the aspects A1 to A5 and the above associated embodiments, the reaction of solids (ash) is carried out with phosphoric acid.

In preferred embodiments of the aspects A1 to A5 and the above associated embodiments, the reaction of solids (ash) is carried out with a mineral acid mixture of phosphoric acid and nitric acid and contains no hydrogen halides (hydrohalic acids). In particular, the mineral acid mixture does not contain hydrochloric acid.

In preferred embodiments of the aspects A1 to A5 and the above associated embodiments, the mineral acid mixture is present in aqueous dilution at a concentration of 5 wt % to 50 wt %, preferably 10 wt % to 30 wt %.

In preferred embodiments of the aspects A1 to A5 and the above associated embodiments, the phosphate-containing ash is mixed with the mineral acid mixture in a reactor, whereby the proportion of ash is 5 wt % to 50 wt %, preferably 20 wt % to 30 wt %, based on the diluted mineral acid.

In preferred embodiments of the aspects A1 to A5 and the above associated embodiments, the mineral acid mixture contains at least phosphoric acid and nitric acid.

In preferred embodiments of the aspects A1 to A5 and the above associated embodiments, the mineral acid mixture contains in addition to phosphoric and nitric acid also sulphuric acid.

In preferred embodiments of the aspects A1 to A5 and the above associated embodiments, the reaction time between acid and ash is 2 to 300 minutes, preferably 10 to 60 minutes.

In preferred embodiments of the aspects A1 to A5 and the above associated embodiments, the reaction temperature is between 20° C. to 90° C., preferably 60° C. to 80° C.

In preferred embodiments of the aspects A1 to A5 and the above associated embodiments, the acid-insoluble portion of the solids is separated by mechanical filtration and/or dewatering process.

In preferred embodiments of the aspects A1 to A5 and the above associated embodiments, the separation of acid-insoluble portion of the solids is performed using dewatering equipment (e.g. vacuum belt filter, chamber filter press, membrane filter press, belt filter press, centrifuge).

In preferred embodiments of the aspects A1 to A5 and the above associated embodiments, the separation of acid-insoluble part of the solids is performed using a vacuum belt filter.

In preferred embodiments of the aspects A1 to A5 and the above associated embodiments, after separation of the acid-insoluble portion of the solids, the residue in the filter units is washed with water and the washing water is fed back to the first process step.

In preferred embodiments of the aspects A2, A4 and A5 as well as the above associated embodiments, the addition of sulphuric acid is performed at a dilution from 10 to 98 wt %, preferably 40 to 80 wt %.

In preferred embodiments of the aspects A2, A4 and A5 as well as the above associated embodiments, the sulphuric acid is added in a molar ratio, which is equivalent to the dissolved calcium concentration of 0.5 Ca to 1.5 $SO_4$ (sulphate), preferably 1.0 Ca to 1.0 $SO_4$ (sulphate).

In preferred embodiments of the aspects A2, A4 and A5 as well as the above associated embodiments, the addition of sulphuric acid is performed in a stirred reactor.

In preferred embodiments of the aspects A2, A4 and A5 as well as the above associated embodiments, the residence time in the stirred reactor after addition of the sulphuric acid is 5 to 60 minutes, preferably 10 to 30 minutes.

In preferred embodiments of the aspects A2, A4 and A5 as well as the above associated embodiments, the reaction temperature (precipitation of calcium sulphate through addition of sulphuric acid) in the stirred reactor is 20° C. to 90° C., preferably 60° C. to 90° C.

In preferred embodiments of the aspects A2, A4 and A5 as well as the above associated embodiments, the calcium sulphate precipitate is separated by mechanical filtration and/or dewatering process.

In preferred embodiments of the aspects A2, A4 and A5 as well as the above associated embodiments, the separation of the calcium sulphate precipitate is carried out with dewatering equipment (e.g. vacuum belt filter, chamber filter press, membrane filter press, belt filter press, centrifuge).

In preferred embodiments of the aspects A2, A4 and A5 as well as the above associated embodiments, the separation of the calcium sulphate precipitate is carried out with a vacuum belt filter.

In preferred embodiments of the aspects A2, A4 and A5 as well as the above associated embodiments, after separation of the calcium sulphate precipitate, the residue in the filter units is washed with water and the washing water is fed back to the first process step.

In preferred embodiments of the aspects A2, A4 and A5 as well as the above associated embodiments, after the separation of calcium sulphate precipitate, the recovered filtrate (diluted mineral acid mixture) is at least partly reused for the digestion of solids.

In preferred embodiments of the aspects A2, A4 and A5 as well as the above associated embodiments, the portion of the filtrate recirculation is at least 10%, preferably at least 20%, even more preferably 20% to 80%, and most preferably 40% to 60%, based on the total amount of obtained filtrate.

In preferred embodiments of the aspects of A3, A4 and A5 as well as the above associated embodiments, after separation of the acid-insoluble portion of the ash or after separation of the calcium sulphate precipitate, the pH-value of the filtrate or the supernatant is increased with alkali or alkaline earth hydroxides or oxides, preferably with caustic soda, caustic potash, sodium silicate solution, calcium hydroxide or calcium carbonate.

In preferred embodiments of the aspects of A3, A4 and A5 as well as the above associated embodiments, the pH-value in a stirred reactor is adjusted to 2.0 to 3.0, preferably to 2.0 to 2.5.

In preferred embodiments of the aspects of A3, A4 and A5 as well as the above associated embodiments, the residence time in the stirred reactor is 5 to 60 minutes, preferably 10 to 30 minutes.

In preferred embodiments of the aspects of A3, A4 and A5 as well as the above associated embodiments, the aluminium hydroxophosphate is separated or obtained by mechanical filtration and/or dewatering process.

In preferred embodiments of the aspects of A3, A4 and A5 as well as the above associated embodiments, the separation/extraction of the aluminium hydroxophosphate precipitate is carried out with dewatering equipment (e.g. vacuum belt filter, chamber filter press, membrane filter press, belt filter press, centrifuge).

In preferred embodiments of the aspects of A3, A4 and A5 as well as the above associated embodiments, the separation/extraction of the aluminium hydroxophosphate precipitate is carried out with a filter press.

In preferred embodiments of the aspects A1 to A5 as well as the above associated embodiments, the filtrate or the supernatant, containing nitric acid ($HNO_3$) and/or phosphoric acid ($H_3PO_4$) optionally obtained by separation of Fe-silicate and/or calcium sulphate and/or aluminium hydroxophosphate, is concentrated by evaporation to an acidity of 30 wt % to 70 wt %, preferably 40 wt % to 60 wt %.

In preferred embodiments of the aspects A1 to A5 as well as the above associated embodiments, in the filtrate or the supernatant, containing nitric acid ($HNO_3$) and/or phosphoric acid ($H_3PO_4$) optionally obtained by separation of Fe-silicate and/or calcium sulphate and/or aluminium hydroxophosphate, the pH-value is adjusted to 4 to 12, preferably 6 to 9, by the addition of calcium oxide or calcium carbonate under the formation of calcium precipitates.

In preferred embodiments of the aspects A1 to A5 as well as the above associated embodiments, calcium oxide or calcium carbonate is added to the filtrate or supernatant, containing nitric acid ($HNO_3$) and/or phosphoric acid ($H_3PO_4$), optionally obtained by separation of Fe-silicate and/or calcium sulphate and/or aluminium hydroxophosphate, in a stirred reactor under formation of calcium precipitates.

In preferred embodiments of the aspects A1 to A5 as well as the above associated embodiments, after the formation of calcium precipitates, the solid suspension is so far evaporated or spray-dried by heat input that a solid with residual moisture content of 0 wt % to 25 wt %, preferably of 2 wt % to 10 wt % is produced.

In preferred embodiments of the aspects A1 to A5 as well as the above associated embodiments, the precipitate or the precipitates occurs as completely or partially insoluble precipitate in form of flakes, droplets or crystalline material, in any microcrystalline, crystalline or amorphous form.

In preferred embodiments of the aspects A1 to A5 as well as the above associated embodiments, the precipitate or the precipitates is further processed, modified, refined etc. to powders, fine powders, dusts, bulk material, granular materials, semolina etc.

EXAMPLES

The entire process is described by the following experimental setup:

Starting material is an ash from a sewage sludge incineration plant. The essential ingredients were analyzed as follows:

| | |
|---|---|
| Wt % P2O5 | 25.0 |
| Wt % CaO | 17.5 |
| Wt % Fe2O3 | 26.9 |
| Wt % Al2O3 | 6.7 |
| Wt % SiO2 | 19.5 |

100 g ash is treated in a beaker glass with 300 g of diluted acid.

The diluted acid is composed of: 70 wt % water; 15 wt % $HNO_3$ and 15 wt % $H_3PO_4$. The suspension is stirred for 30 minutes at 40° C. and then filtered through a vacuum-nutsch (with filter) (Vacuum Büchner-Funnel with filter). The filter cake is then weighed and further dried at 100° C.

Wet filter cake=122 g

Dried filter cake=72 g

It can be calculated that from 100 g ash 72 g have not been dissolved in acid, 28 g (=28%) are acid soluble. In total, 275 g filtrate was recovered and subsequently analysed. The analysis results in the following table were compared with theoretical values that arise, if the significant ash contents would have resolved to 100% (in the filtrate and the wet portion of the filter cake):

| | (100%) | (is) | acid soluble |
|---|---|---|---|
| Wt % P2O5 | 17.78* | 13.68 | 88.7% |
| Wt % CaO | 5.37 | 4.80 | 89.4% |
| Wt % Fe2O3 | 8.25 | 0.47 | 5.7% |
| Wt % Al2O3 | 2.06 | 1.56 | 75.7% |
| Wt % SiO2 | 5.98 | 0.02 | 0.3% |

*7.69% $P_2O_5$ result from the ash, 10.09% $P_2O_5$ from the added phosphoric acid.

The results illustrate that high re-dissolving rates of phosphate, calcium and aluminium can be achieved, while iron is dissolved only slightly, and silicon as $SiO_2$ is as expected almost insoluble. The concentration of $H_3PO_4$ has increased from the previous 15 wt % to 13.68×1.37=18.7 wt % (1.37=conversion factor from $P_2O_5$ to $H_3PO_4$). An acid with 37.4% $H_3PO_4$ and 30% $HNO_3$ can be obtained by evaporation by the factor 2. This acid can be used for the production of fertilizers or is neutralized with CaO, and then evaporated, whereby a double salt of $Ca(NO_3)_2$*$Ca(H_2PO_4)_2$ can be formed.

This method has the disadvantage that on the one hand, considerable amounts of nitric acid and phosphoric acid are required, and on the other hand, contaminations of iron and aluminium salts impair the product quality. The process would be economically borderline and the value of the end products greatly limited.

These problems, which are massive especially with higher Al concentrations in the sewage sludge ashes (that can account for more than 20% $Al_2O_3$), are solved, according to the invention, by the multistep process in step 2 and step 3 as follows:

The filter cake (122 g wet weight) from the above-described 1st step (the ash dissolving process) is washed with 100 g of hot water (70-90° C.). The obtained wash filtrate is mixed together with 200 g filtrate from the 1st step (dilute acid) with 25 g of sulphuric acid (48 wt %) in a beaker glass (total weight=100+200+25=325 g). According to the above described reaction, white calcium sulphate precipitates after a few minutes. After 30 minutes, the precipitate was filtered through a vacuum-nutsch (with filter) (Vacuum Büchner-Funnel with filter). Obtained was 280 g filtrate and 43 g gypsum-wet-filter cake. The filtrate was analyzed.

The analysis results in the following table are compared with values that result from a parallel experiment, whereby the filtrate from the 1st step plus the washing water have been analyzed in the ratios mentioned above:

| | filtrate + WW | after Ca-precipitation |
|---|---|---|
| pH-value | 1.9 | 0.9 |
| Wt % P2O5 | 9.58 | 9.43 |
| Wt % CaO | 3.70 | 1.45 |
| Wt % Fe2O3 | 0.32 | 0.33 |
| Wt % Al2O3 | 0.98 | 1.01 |

It is clear from the data that the Ca-content is reduced and at the same time also the pH-value, due to the fact that additional H-ions could form. The acidic filtrate of the 2nd step can thus be used for dissolving the ash, whereas the dosage of $H_3PO_4$ can be completely dispensed with, since new phosphoric acid is constantly formed from the phosphate-containing ash. This step is of particular note in the multistep method, due to the fact that by using the sulphuric acid overall costs are reduced (sulphuric acid is, according to its efficiency, the cheapest acid), and because gypsum is additionally recovered.

With the recycled filtrate (low calcium dilute acid) is the recipe of the 1st step now as follows: 100 g ash are treated in a beaker glass with 300 g of dilute acid. The dilute acid is composed of: 270 g recyclate and 20 g $HNO_3$. The suspension is stirred for 30 minutes at 40° C. and then filtrated through a vacuum-nutsch (with filter) (Vacuum Büchner-Funnel with filter). The filter cake is subsequently weighed and further dried at 100° C.

Wet filter cake=130 g

Dried filter cake=75 g

It can be calculated that from 100 g ash 75 g have not been dissolved in acid, i.e. 25 g (=25%) are acid soluble. In total, 258 g filtrate (dilute acid) was recovered and then analyzed. The analysis results essentially correspond with the results of the 1st starting step, only the CaO-content was with 5.8% CaO slightly higher (because even extra calcium was added over the recyclate), while the $Al_2O_3$ content has increased further from 1.5 to 2.6%. In a 3rd step, the aluminium concentration in the dilute acid is reduced by adding small amounts of calcium oxide. For this purpose, 150 g dilute add is mixed at room temperature with 1 g CaO. A precipitate was formed, which was filtered with a vacuum-nutsch (with filter) (Vacuum Büchner-Funnel with filter) after 15 minutes. Obtained were 123 g filtrate and 25 g wet filter cake. The filtrate was analyzed.

The analysis results in the following table are compared with values that result from a parallel experiment, whereby the dilute acid has been analyzed before the addition of CaO

| | Dilute acid | after Al-precipitation |
|---|---|---|
| pH-value | 0.9 | 2.2 |
| Wt % P2O5 | 9.35 | 8.95 |
| Wt % CaO | 5.84 | 6.42 |
| Wt % Fe2O3 | 0.54 | 0.48 |
| Wt % Al2O3 | 2.61 | 0.84 |

Al—$PO_4$-precipitate is formed due to a minor increase of the pH-value, what can be seen based on the decreased values for $P_2O_5$ and $Al_2O_3$. The values are deliberately only slightly reduced by the precipitation, since an excessive accumulation of aluminium ions shall be entirely prevented. The water-washed and dried precipitate was analyzed as follows:

| | |
|---|---|
| Wt % P2O5 | 31.3 |
| Wt % CaO | 1.1 |
| Wt % Fe2O3 | 3.5 |
| Wt % Al2O3 | 56.1 |

The precipitate was further treated in an additional experiment, according to patent DE 10 2012 015 065 B3 Jul. 18, 2013, and has been converted to sodium aluminate solution and a calcium phosphate precipitate.

The process steps described herein are applied variably, depending on the concentration of Ca and Al ions in the digestion acid (or the corresponding oxide concentrations in the ash). The essence of the invention is that an economic process management is possible through combination of process steps and particularly low-aluminium end products are obtained.

The purified $HNO_3$—$H_3PO_4$ acid is preferably neutralized with CaO to a pH-value of 6 and concentrated by evaporation of water, e.g. by spray-drying. The result is a double salt of calcium nitrate and calcium phosphate. According to the invention, a salt with the following composition could be formed: 19.5 wt % P2O5; 28.5 wt % CaO; 24.3 wt % NO3; 0.8 wt % Al2O3, 0.6 wt % Fe2O3.

Figure 3:
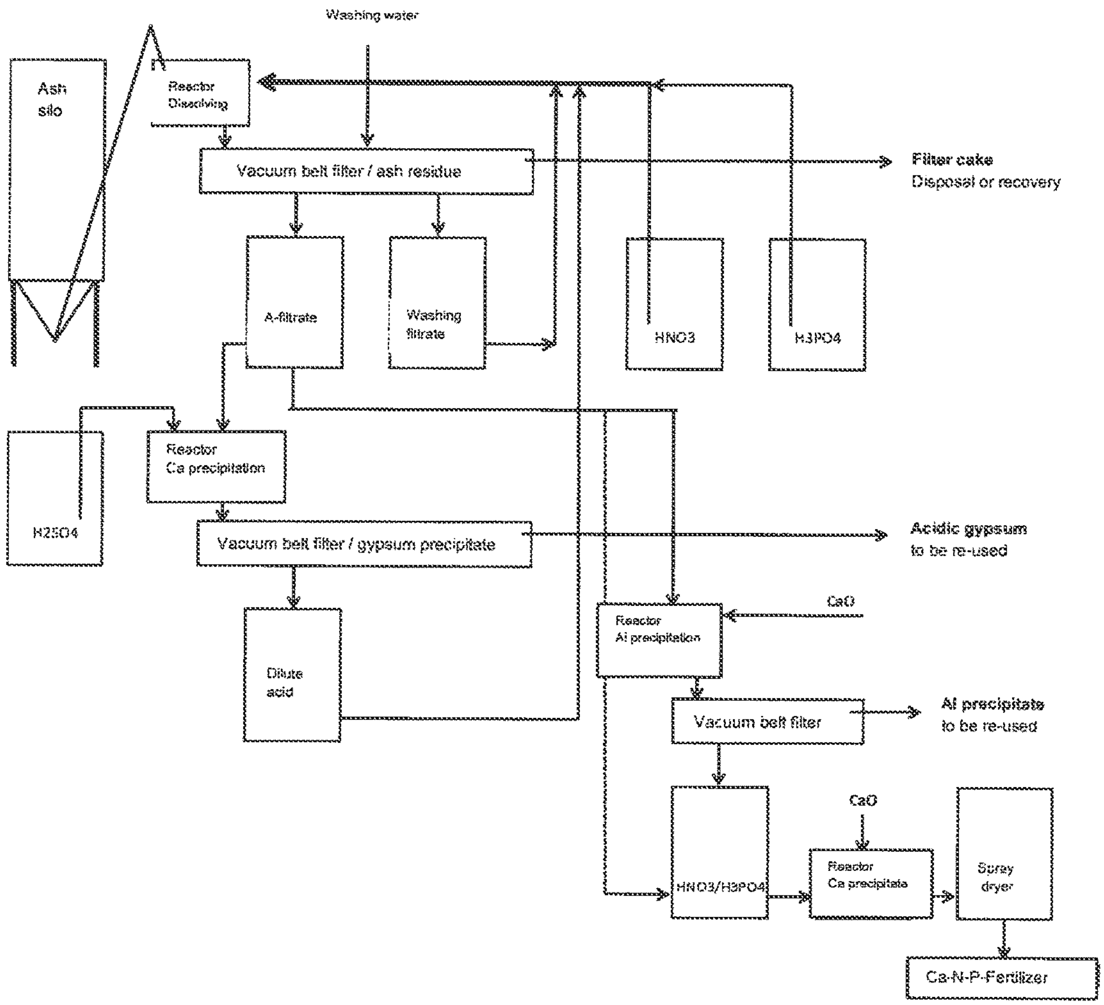

FIG. 3 shows the scheme of the various processes.

The invention claimed is:

1. A method for obtaining precipitates of calcium sulphate ($CaSO_4$) and for production of phosphoric acid from phosphate-containing ashes from waste incineration plants, characterized in that a) combining the phosphate-containing ashes with phosphoric acid to cause a reaction, b) separating an acid-insoluble portion of the phosphate-containing ashes from the reaction of step a), c) adding sulfuric acid to a filtrate or supernatant of step b) and thereby adjusting the pH to <1, to obtain and separate calcium sulphate precipitate and to thereby also obtain purified phosphoric acid as the filtrate or the supernatant of step c), d) recycling at least partially the filtrate or supernatant of step c) as the phosphoric acid for use in step a).

2. The method according to claim 1, additionally comprising:

e) adding calcium oxide or calcium carbonate to the remainder of the filtrate or supernatant of step d) to obtain and separate calcium phosphate precipitate and calcium nitrate precipitate.

3. The method according to claim 1 additionally comprising:

e) raising the pH-value of the filtrate or the supernatant of step d) to obtain and separate the dissolved aluminium as aluminium hydroxophosphate precipitate, and f) adding calcium oxide or calcium carbonate to the remainder of the filtrate or supernatant of step d) to obtain and separate calcium phosphate precipitate and calcium nitrate precipitate.

4. The method according to claim 1 further comprising the obtaining of precipitates selected from the group of calcium nitrate ($CaNO_3$), calcium phosphate ($Ca_3(PO_4)_2$), calcium sulphate ($CaSO_4$), and aluminium hydroxophosphate ($Al(OH)_3 \times AlPO_4$) from phosphate-containing ashes from waste incineration plants, by a) combining the phosphate-containing ashes with nitric acid or phosphoric acid or a mineral acid mixture of these two acids to cause a reaction, b) separating an acid-insoluble portion of the phosphate-containing ashes from the reaction of step a), c) addition of sulfuric acid to the filtrate or supernatant of step b) to obtain and separate calcium sulphate precipitate with a mechanical filtration and/or dewatering process, d) raising the pH-value of the filtrate or supernatant of step c) to obtain and separate the dissolved aluminium as aluminium hydroxophosphate precipitate with a mechanical filtration and/or dewatering process, e) recycling partially the filtrate or supernatant of step d) for use in step a), f) concentrating the remainder of the filtrate or the supernatant of step d) by evaporation, or g) adding of calcium oxide or calcium carbonate to the filtrate or supernatant of step f) to obtain and separate calcium phosphate precipitate and calcium nitrate precipitate with a mechanical filtration and/or dewatering process.

5. The method according to claim 2 characterized in that the sulfuric acid is added in a dilution from 10 to 98 wt %, in a stirred reactor, whereby the sulfuric acid is added in a molar ratio, corresponding to the dissolved calcium concentration of 0.5 Ca to 1.5 $SO_4$ (sulphate).

6. The method according to claim 3 characterized in that the pH-value is adjusted to 2.0 to 3.0, with alkali or alkaline earth hydroxides or oxides, wherein the alkali or alkaline earth hydroxides or oxides is selected from the caustic soda, caustic potash, sodium silicate solution, calcium hydroxide or calcium carbonate.

7. Method according to claim 6, characterized in that the phosphate-containing ash is obtained by incineration Of phosphate-containing sewage sludges, biodegradable wastes, bio-wastes and/or animal wastes in a waste incineration plant.

8. The method according to claim 1 characterized in that the reaction of the phosphate-containing ashes is carried out with a mineral acid mixture, wherein said mineral acid mixture is present at a concentration of 5 wt % to 50 wt %, in aqueous dilution, and, optionally, the phosphate-containing ash is mixed in a reactor with the mineral acid mixture, wherein the proportion of ash is 5 wt % to 50 wt %, based on the diluted mineral acid mixture.

9. The method of claim 8, wherein the mineral acid mixture contains at least phosphoric acid ($H_3PO_4$) and nitric acid ($HNO_3$), wherein the diluted mineral acid mixture contains 10 wt % to 50 wt % $HNO_3$, and 90 to 50 parts of $H_3PO_4$, based on the complete mineral acid content of the aqueous dilution.

10. The method according to claim 2 additionally comprising:

e) raising the pH-value of the filtrate or supernatant of step d) to obtain and separate the dissolved aluminium as aluminium hydroxophosphate precipitate, and f) adding calcium oxide or calcium carbonate to the remainder of filtrate or supernatant of step d) to obtain and separate calcium phosphate precipitate and calcium nitrate precipitate.

11. The method according to claim 2 further comprising the obtaining of precipitates selected from the group of calcium nitrate ($CaNO_3$), calcium phosphate ($Ca_3(PO_4)_2$), calcium sulphate ($CaSO_4$), and aluminium hydroxophosphate ($Al(OH)_3 \times AlPO_4$) from phosphate-containing ashes from waste incineration plants, by a) combining the phosphate-containing ashes with nitric acid or phosphoric acid or a mineral acid mixture of these two acids to cause a reaction, b) separating an acid-insoluble portion of the phosphate-containing ashes from the reaction of step a) with a mechanical filtration and/or dewatering process, c) addition of sulfuric acid to the filtrate or supernatant to obtain and separate calcium sulphate precipitate with a mechanical filtration and/or dewatering process, d) raising the pH-value, of the filtrate or the supernatant of step c) to obtain and separate the dissolved aluminium as aluminium hydroxophosphate precipitate with a mechanical filtration and/or dewatering process, e) recycling partially the filtrate or supernatant of step d) for use in step a), f) concentrating the remainder of the filtrate or the supernatant of step d) by evaporation, or g) adding of calcium oxide or calcium carbonate to the filtrate or supernatant of step f) to obtain and separate calcium phosphate precipitate and calcium nitrate precipitate with a mechanical filtration and/or dewatering process.

12. The method according to claim 3 comprising the obtaining of precipitates selected from the group of calcium nitrate ($CaNO_3$), calcium phosphate ($Ca_3(PO_4)_2$), calcium sulphate ($CaSO_4$), and aluminium hydroxophosphate ($Al(OH)_3 \times AlPO_4$) from phosphate-containing ashes from waste incineration plants, characterized in that a) combining the phosphate-containing ashes with nitric acid or phosphoric acid of a mineral acid mixture of these two acids to cause a reaction, b) separating an acid-insoluble portion of the phosphate-containing ashes from the reaction of step a) with a mechanical filtration and/or dewatering process, c) addition of sulfuric acid to the filtrate or supernatant to obtain and separate calcium sulphate precipitate with a mechanical filtration and/or dewatering process, d) raising the pH-value of the filtrate or the supernatant of step c) to obtain and separate the dissolved aluminium as aluminium hydroxophosphate precipitate with a mechanical filtration and/or dewatering process, e) recycling partially the filtrate or supernatant of step d) for use in step a), f) concentrating the remainder of the filtrate or the supernatant of step d) by evaporation, or g) adding of calcium oxide or calcium carbonate to the filtrate or supernatant of step f) to obtain and separate calcium phosphate precipitate and calcium nitrate precipitate with a mechanical filtration and/or dewatering process.

13. The method according to claim 3 characterized in that the sulfuric acid is added in a dilution from 10 to 98 wt %, in a stirred reactor, whereby the sulfuric acid is added in a molar ratio, corresponding to the dissolved calcium concentration of 0.5 Ca to 1.5 $SO_4$ (sulphate).

14. The method according to claim 4 characterized in that the sulfuric acid is added in a dilution from 10 to 98 wt %, in a stirred reactor, whereby the sulfuric acid is added in a molar ratio, corresponding to the dissolved calcium concentration of 0.5 Ca to 1.5 $SO_4$ (sulphate).

15. The method according to claim 4 characterized in that the pH-value is adjusted to 2.0 to 3.0, with alkali or alkaline earth hydroxides or oxides, wherein the alkali or alkaline earth hydroxides or oxides is selected from caustic soda, caustic potash, sodium silicate solution, calcium hydroxide or calcium carbonate.

16. Method according to claim 15, characterized in that the phosphate-containing ash is obtained by incineration of phosphate-containing sewage sludges, biodegradable wastes, bio-wastes and/or animal wastes in a waste incineration plant.

17. The method according to claim 2 characterized in that the reaction of the phosphate-containing ashes is carried out with a mineral acid mixture, wherein said mineral acid mixture is present at a concentration of 5 wt % to 50 wt %, in aqueous dilution, and, optionally, the phosphate-containing ash is mixed in a reactor with the mineral acid mixture, wherein the proportion of ash is 5 wt % to 50 wt %, based on the diluted mineral acid mixture.

18. The method according to claim 3 characterized in that the reaction of the phosphate-containing ashes is carried out with a mineral acid mixture, wherein said mineral acid mixture is present at a concentration of 5 wt % to 50 wt %, in aqueous dilution, and, optionally, the phosphate-containing ash is mixed in a reactor with the mineral acid mixture, wherein the proportion of ash is 5 wt % to 50 wt %, based on the diluted mineral acid mixture.

19. The method according to claim 4 characterized in that the reaction of the phosphate-containing ashes is carried out with a mineral acid mixture, wherein said mineral acid mixture is present at a concentration of 5 wt % to 50 wt %, in aqueous dilution, and, optionally, the phosphate-containing ash is mixed in a reactor with the mineral acid mixture, wherein the proportion of ash is 5 wt % to 50 wt %, based on the diluted mineral acid mixture.

20. The method of claim 17, wherein the mineral acid mixture contains at least phosphoric acid ($H_3PO_4$) and nitric acid ($HNO_3$), wherein the diluted mineral acid mixture contains 10 wt % to 50 wt % $HNO_3$, and 90 to 50 parts of $H_3PO_4$, based on the complete mineral acid content of the aqueous dilution.

* * * * *